United States Patent [19]

Hagiwara et al.

[11] 4,113,595

[45] Sep. 12, 1978

[54] PROCESS FOR PRODUCING MOLDED PRODUCT COMPOSED OF CROSSLINKED RESIN OR CROSSLINKED-RESIN COATED MATERIAL ON A SUBSTRATE BY MEANS OF ELECTRON BEAM

[75] Inventors: Miyuki Hagiwara, Maebashi; Kunio Araki, Takasaki; Shingo Matsuoka, Tokai; Syunichi Fujimura, Hiratsuka, all of Japan

[73] Assignees: Japan Atomic Energy Research Institute; The Furukawa Electric Company Limited, both of Tokyo, Japan

[21] Appl. No.: 639,066

[22] Filed: Dec. 9, 1975

[30] Foreign Application Priority Data

Dec. 11, 1974 [JP] Japan .................. 49-142272

[51] Int. Cl.$^2$ .............................. C08F 8/00
[52] U.S. Cl. .................... 204/159.17; 260/878 R; 260/879; 260/886; 427/44
[58] Field of Search ............ 204/159.17, 159.2, 159.18

[56] References Cited

U.S. PATENT DOCUMENTS

| 3,391,107 | 7/1968 | Stahly .................... 260/45.95 R |
| 3,392,096 | 7/1968 | Lawton et al. ............ 204/159.15 |
| 3,414,498 | 12/1968 | Shinohara et al. ........ 204/159.13 |
| 3,835,004 | 9/1974 | Kagiya et al. ............ 204/159.17 |
| 3,846,267 | 11/1974 | Tabata et al. ............ 204/159.17 |
| 3,894,928 | 7/1975 | Kagjya et al. ............ 204/159.17 |
| 3,899,406 | 8/1975 | Roodvoets ............... 204/159.2 |
| 3,923,621 | 12/1975 | Murayama et al. ........ 204/159.17 |

Primary Examiner—Richard B. Turer
Attorney, Agent, or Firm—Flynn & Frishauf

[57] ABSTRACT

A process for producing molded product composed of crosslinked resin or coated material composed of crosslinked resin on a substrate which comprises blending a polyolefin-series resin, a compound represented by the formula $$X - Y_m \qquad \text{I}$$

wherein X is a group not containing an acetylenic linkage, Y is a group containing an acetylenic linkage and $m$ is an integer of 1 or more, which is compatible with the resin at a room temperature or an elevated temperature, and a compound selected from the group consisting of an amino compound represented by the formula $$\underset{R_1-N-R_2}{\overset{H}{|}} \qquad \text{II}$$

wherein each of $R_1$ and $R_2$ is independently substituted or non-substituted aliphatic hydrocarbon, substituted or non-substituted alicyclic hydrocarbon, or substituted or non-substituted aromatic hydrocarbon, provided that at least one of $R_1$ or $R_2$ is substituted or non-substituted aromatic hydrocarbon, an amino compound represented by the formula $$\underset{R_3-N-R_4-N-R_5}{\overset{H\quad H}{|\quad\;\;|}} \qquad \text{III}$$

wherein each of $R_3$, $R_4$ and $R_5$ is independently substituted or non-substituted aliphatic hydrocarbon, substituted or non-substituted alicyclic hydrocarbon, or substituted or non-substituted aromatic hydrocarbon, provided that at least one of $R_3$, $R_4$ and $R_5$ is substituted or non-substituted aromatic hydrocarbon; and mixtures thereof which are compatible with the resin at a room temperature or an elevated temperature; and molding the mixture or coating the mixture on a substrate and irradiating the resulting molded material or the resulting coated material by means of an electron beam.

13 Claims, No Drawings

PROCESS FOR PRODUCING MOLDED PRODUCT COMPOSED OF CROSSLINKED RESIN OR CROSSLINKED-RESIN COATED MATERIAL ON A SUBSTRATE BY MEANS OF ELECTRON BEAM

DESCRIPTION OF THE INVENTION

This invention relates to a process for producing a molded product, such as a sheet, hollow pipe or hollow tube composed of crosslinked resin, or coated material composed of crosslinked resin on a substrate which comprises blending a polyolefin-series resin, a specific compound for promoting crosslinking reaction and a specific compound having an aromatic group and an amino group, and molding the mixture or coating the mixture on a substrate; and irradiating the resulting molded material or the resulting coated material by means of an electron beam. According to this invention accumulation of electron charge is avoided during irradiation of the molded or coated material and also foaming of the material is prevented. Furthermore, according to this invention, introduction of sufficient crosslinkage into a polymer is possible even by irradiating it with a low total dose of electron beam.

In the prior art, in order to improve mechanical and chemical properties, introduction of crosslinkage into a formable molded product composed of a polymer was found to be desirable from an economic point of view, because the introduction of crosslinkage into the polymer makes it possible to obtain a molded product having excellent mechanical and chemical properties with the use of a cheaper polymer.

Therefore, an attempt has been made to introduce crosslinkage into a molded polymer by means of an electron beam. Since the cost of crosslinking a polymer by means of an electron beam has been reduced due to improvements in technique on electron accelerator devices, a process for crosslinking a polymer with an electron beam is expected to be practiced.

However, it has been found that deterioration in quality of the molded product which does not occur in the conventional process for crosslinking a polymer occurs when a polymer was crosslinked by electron beam irradiation. Therefore, if the problem of deterioration is not solved, the process for crosslinking polymer by means of electron beam can not be practiced.

In order to introduce sufficient crosslinkage into a polymer by irradiating it with an electron beam, the polymer is required to be irradiated with a large total dose of an electron beam. The temperature of polyolefin-series resin is raised in a moment by electron beam irradiation, and as a result, the resin is somewhat subjected to thermal deterioration. The formation of crosslinkage generates hydrogen, and also the thermal deterioration generates hydrogen. Foaming of the resin is caused by such hydrogen generated. In other words, when the total dose of electron beam necessary to introduce crosslinkage into the polyolefin-series resin is great or when the temperature of the resin is high, foaming of the resin occurs during irradiation, and results in the formation of inferior molded product.

For example, in order to introduce sufficient crosslinkage into polyethylene on a substrate or molded polyethylene product by an electron beam irradiation, electron beam must be applied in a total dose of 20 Mrad or more. But when the polyethylene coating or polyethylene molding is irradiated with a total dose of such magnitude, heat generated by the irradiation tends to accumulate in the polyethylene, and foaming occurs in the polyethylene insulating layer.

In addition to the above problem, the amount of electric charge is accumulated along the track of electron beams shot into the polymer, and the accumulated electric charge has a bad effect upon performance of the molded product. For example, when a section thickness of the molded product composed of polymer is more than 0.5 mm or when accelerator energy is more than 1.0 MeV, partial breakdown (what is called Lichtenberg breakdown) in the coated material composed of polyethylene or molded product composed of polyethylene is caused by the accumulation of an electric charge in the product. As a result, when electric cable having the coated material in which Lichtenberg breakdown occurs is used, discharge is very likely to occur due to the reason that the coated material loses its function as an insulating layer. When the molded product in which Lichtenberg breakdown occurs is used as a hollow pipe or tube, the product is likely to be broken because of loss of its mechanical properties. For example, in the case of an acrylic resin Lichtenberg breakdown is easily detectable with the naked eye.

Foaming tends to occur, when the temperature of the molded product is high, whereas little or no accumulation of electric charge in the molded product occurs. On the other hand, when the temperature of the molded product is relatively low, foaming of the molded product rarely occurs, but the accumulation of electric charge is likely to occur in the molded product.

In order to prevent impairment of the molded product in case of irradiating the product with an electron beam, a process for intermittently irradiating the molded product with an electron beam and a process for adding a crosslinking agent to the polymer before irradiation have been proposed. Though these processes are effective in preventing the polymer from foaming, these processes do not prevent great accumulation of electric charge which causes the Lichtenberg breakdown.

The mechanism of the accumulation of electric charge in the polymer irradiated with an electron beam is not known at present. In the prior art, a process for preventing the Lichtenberg breakdown caused by the accumulation of electric charge from occurring has not been found.

We have carried out many experiments to find a process for preventing the Lichtenberg breakdown caused by the accumulation of electric charge. As a result, we have found that the amount of electric charge accumulated in a polyolefin-series resin irradiated with an electron beam is much less, if, before irradiation, there is added to the polyolefin-series resin a compound selected from the group consisting of (a) an amino compound represented by the formula

II wherein each of $R_1$ and $R_2$ is independently aliphatic hydrocarbon, alicyclic hydrocarbon, or aromatic hydrocarbon, provided that at least one of $R_1$ and $R_2$ is aromatic hydrocarbon, and each of the aliphatic hydrocarbon, the alicyclic hydrocarbon and the aromatic hydrocarbon may be substituted by hydroxy, methoxy, nitrile, chloro, bromo or fluoro; (b) an amino compound represented by the formula

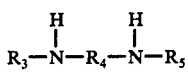

III wherein each of $R_3$, $R_4$ and $R_5$ is independently aliphatic hydrocarbon, alicyclic hydrocarbon, or aromatic hydrocarbon, provided that at least one of $R_3$, $R_4$ and $R_5$ is aromatic hydrocarbon, and each of the aliphatic hydrocarbon, the alicyclic hydrocarbon and the aromatic hydrocarbon may be substituted by hydroxy, methoxy, nitrile, chloro, bromo or fluoro; and (c) mixtures thereof, which are compatible with the resin at a room temperature or at an elevated temperature. The compounds of the above Formulas II and III are hereinafter referred for convenience as "aromatic secondary amino compounds".

Also, it has been found that when a molded product prepared from the polyolefin-series resin containing the aromatic secondary amino compound and a compound represented by the formula $$X—Y_m \qquad I$$

wherein X is a group not containing an acetylenic linkage, Y is a group containing an acetylenic linkage, and m is integer of 1 or more, which is compatible with the resin at a room temperature or an elevated temperature, is irradiated with electron beam, little or no Lichtenberg breakdown occurs in the product. The compound of the formula I is hereinafter referred to, for convenience, as "compound having acetylenic linkage". The present invention was formed on the basis of these discoveries. According to the present invention, sufficient crosslinkage can be introduced into a molded product composed of a polymer without effecting Lichtenberg breakdown.

In addition, the compound having acetylenic linkage promotes crosslinking, so sufficient crosslinkage can be introduced into the polymer at a relatively low total dose of electron beam according to the present invention. Foaming of the molded product caused by heat generated during irradiation can also be avoided according to the present invention.

In the present invention, preferably, the accelerator energy of the electron beam is at least 1.0 MeV. The term "electron beam" means accelerated electron. The molded product is irradiated at a dose rate of $10^2$ rad/sec - $10^7$ rad/sec, preferably $10^4$ rad/sec - $10^7$ rad/sec. The term "polyolefin-series" in the specification and the claims means polymers of olefinic monomers, such as ethylene, propylene, 1 or 2-butene, 1-decene, styrene and the like; polymers of diolefinic monomers, such as butadiene, isoprene and the like; ethylene-propylene copolymers; ethylene-vinyl acetate copolymers; copolymers of ethylene or propylene and vinyl chloride or vinyl acetate, mixtures thereof; or mixtures of a major amount of the polymer or copolymer with a minor amount of other polymers. Polyethylene, polypropylene, polystyrene or ethylene-propylene copolymer is preferred as the resin. A reinforcing agent, a lubricant, a plasticizer, an ultraviolet light absorber, an anti-static agent, or a pigment may be added to the polymer.

In the present invention, the compound having acetylenic linkage represented by the formula $$X—Y_m$$

wherein X, Y and m is as defined above, means a compound represented by the formula

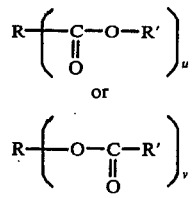

wherein R is an aromatic group, aliphatic group, or aliphatic hydrocarbon interrupted by oxygen or sulfur, and each aliphatic group and each aromatic group may be substituted by hydroxy, methoxy, amino, nitrile, chloro, bromo or fluoro R has the same valency as the number of u or v; R' is alkynyl; u is an integer of 1 or more, preferably an integer of from 1 to 3, inclusive; and v is an integer of 1 or more, preferably an integer of from 1 to 3, inclusive.

Typical examples of the compounds include propargyl methacrylate, propargyl crotonate, propargyl linolenate, 3-butynyl methacrylate, 3-butynyl linolenate, dipropargyl succinate, dipropargyl 2-chlorosuccinate, dipropargyl glutarate, dipropargyl adipate, dipropargyl suberate, dipropargyl fumarate, dipropargyl maleate, dipropargyl-l-malate, dipropargyl sebacate, dipropargyl pimerate, dipropargyl azelate, dipropargyl itaconate, dipropargyl citraconate, dipropargyl phthalate, dipropargyl 2-methoxyphthalate, dipropargyl isophthalate, dipropargyl terephthalate, dipropargyl 3-methylphthalate, tripropargyl propane 1,2,3 tricarbonate, tripropargyl trimellitate, tripropargyl trimesate, di-3-butynyl succinate, di-3-butynyl maleate, di-3-butynyl phthalate, tri-3-butynyl trimellitate, tetrapropargyl tyromellitate, stealyl propiolate, phenyl propiolate, allyl propiolate, dimethylene dipropiolate, trimethylene dipropiolate, tetramethylene dipropiolate, hexamethylene dipropiolate, octamethylene dipropiolate, propyleneglycol dipropiolate, resorcin dipropiolate, catecol dipropiolate, 2-chlorocatecol dipropiolate, glycerin 1,3-dipropiolate, hydroquinone dipropiolate, dimethylene diethynylacetate, glycerin tripropiolate, diethyleneglycol dipropiolate, trimethylolpropane tripropiolate, and pentaerythrityl tetrapropiolate.

Esters of acetylenic alcohols and polybasic carboxylic acids and esters of acetylenic carboxylic acids and polyhydric alcohols having a high boiling point and a high decomposition temperature are preferred as compounds having acetylenic linkage. Dipropargyl maleate, dipropargyl fumarate, dipropargyl terephthalate, dipropargyl isophthalate, dipropargyl sebacate, tripropargyl trimesate, tetramethylene dipropiolate, hexamethylene dipropiolate, hydroquinone dipropiolate, catecoal dipropionate and diethyleneglycol dipropiolate are preferred. Dipropargyl maleate is most preferred. Acetylene is gaseous, and is not compatible with the polyolefinic series resin, and reacts with a heavy metal to form an explosive reaction product, so acetylene is not usable in the present invention.

The amount of the compound having an acetylenic linkage added to the polyolefin-series resin may vary over a wide range. It is preferred that 0.1–10 parts by weight of the compound be used per 100 parts by weight of crystalline polymer, such as polyethylene polypropylene or polystyrene and having relatively poor compatibility. It is preferred that 1-50 parts by weight of the compound be used per 100 parts of noncrystalline polymer such as an ethylene-vinyl acetate copolymer or ethylene-propylene copolymer having good compatibility. When the amount of a compound having acetylenic linkage added to the polymer is less than the above lower limit, sufficient crosslinkage is difficult to be introduced into the polymer. When more than 10 parts by weight of the compound is added to 100 parts by weight of a polymer having relatively poor compatibility, it is difficult to dissolve all the compound in the polymer. Addition of the compound in an amount of than 50 parts by weight to 100 parts of a polymer having good compatibility is not economical.

The aromatic secondary amino compound to be added to the polyolefin-series resin prevents the accumulation of electric charge in the polymer during irradiation. It is essential that the compound be compatible with the polyolefin-series resin. Typical examples of the compound include N-t-butyl-aniline, N-cyclohexyl-aniline, N-phenyl-2-naphthylamine, N-t-butyl-2-naphthylamine, N-cyclohexyl-2-naphthylamine, 2,2′-dinaphthylamine, diphenyl-p-phenylenediamine, N-2-methylpropyl-N′-phenyl-p-phenylenediamine, N-cyclohexyl-N′-phenyl-p-phenylenediamine, N,N′-dicyclohexyl-p-phenylenediamine, N-p-phenol-N′-phenyl-p-phenylenediamine, N,N′-di-2-naphthyl-p-phenylenediamine, N,N′-di-2-naphthyl ethylenediamine, N-t-butyl-N′-phenyl ethylenediamine and N,N′-diphenyl-ethylenediamine. Particularly, N,N′-diphenyl-p-phenylenediamine, N-phenyl-2-naphthylamine or N,N′-di-2-naphthyl-p-phenylenediamine is preferred as the aromatic secondary amino compound. When the polyolefin-series resin containing only the aromatic secondary amino compound is irradiated with an electron beam, the compound tends to suppress to a considerable extent the crosslinking reaction, because of resonance stabilization attributed to the aromatic group in the compound. However, in case of adding the compound having acetylenic linkage and the aromatic secondary amino compound to the resin, the suppressing action of the crosslinking reaction by the aromatic secondary amino compound is offset by the compound having acetylenic linkage. In a process for crosslinking the molded product prepared from the resin containing the two compounds according to the present invention, the accumulation of electric charge is not only prevented in the product, but also the aromatic secondary amino compound prevents the aging of the product.

The amount of the aromatic secondary amino compound added to the resin varies over a wide range. It is preferred that 0.05–5 parts by weight of the compound be added to 100 parts by weight of the resin. The accumulation of the electric charge in the molded polymer can not be prevented sufficiently if less than 0.05 part by weight of the aromatic secondary amino compound is used per 100 parts by weight of the resin.

Even when more than 5 parts by weight of the aromatic secondary amino compound are added to 100 parts by weight of the resin, the effect of preventing the accumulation of electric charge in the polymer is not further increased. The addition of too large an amount of the aromatic secondary amino compound to the resin tends to suppress the crosslinking reaction, and also the resulting molded product is likely to be discolored.

A section thickness of the molded product or a thickness of the coated material prepared according the present invention is conveniently more than 0.5 mm.

A variety of molded products, such as, for example, hollow tube, hollow pipe, sheet or plate can be prepared according to the present invention. The coated material for an electric cable or protecting material may be prepared according to the present invention. In this case, a mixture of a polyolefin-series resin, a compound having acetylenic linkage and an aromatic secondary amino compound is coated on a substrate, such as leading wire and the like, and the coated material is irradiated with an electron beam to crosslink the material.

According to the present invention, sufficient crosslinkage can be introduced into a polyolefin-series resin without effecting Lichtenberg breakdown and without foaming of the resin by heat, whereby a polyolefin-series resin having good performance can be obtained.

This invention is further illustrated, but in no way limited, by the following Examples. The parts and percent are by weight unless otherwise specified.

The gel percent of each one of the cured resins was determined by the following method to measure the effect of the additives for curing the resin. The method comprises extracting the cured resin with xylene for 100 hours while refluxing in a Soxlet extractor, and weighing the residue. The gel percent of cured resin represents the degree of curing of the resin.

EXAMPLES 1–5 AND COMPARATIVE EXAMPLES 1–5

Each of the mixtures of components shown in the following Table 1 having the proportion shown in Table 1 was uniformly milled by heat roll. Sheets having a thickness of 3 mm were prepared from each of the uniform mixtures by press molding. Each sheet (except the sheet of Comparative Example 5) was continuously irradiated with an electron beam (1 MeV, $1 \times 10^5$ rad/sec) under a natural atmosphere. The sheet of Comparative Example 5 was continuously irradiated with the same electron beam after heating it to 50° C. The total dose of irradiation for each sheet, gel percent of each sample, whether foaming of the samples was detected, exotherm initiate temperature by Differential Scanning Calorimeter (hereinafter abbreviated as DSC) curve, and whether appearance of the Lichtenberg figures is detected are shown in Table 1.

Table 1

|  |  | Example | | | | | Comparative Example | | | | |
|---|---|---|---|---|---|---|---|---|---|---|---|
|  |  | 1 | 2 | 3 | 4 | 5 | 1 | 2 | 3 | 4 | 5 |
| polyethylene of low density | (part) | 100 | 100 | 100 | 100 | 100 | 100 | 100 | 100 | 100 | 100 |
| diallyl maleate | (part) | — | — | — | — | — | — | — | 5 | — | — |
| dipropargyl maleate | (part) | 2 | 2 | 2 | 0.5 | 7 | — | — | — | 2 | — |
| thio bis(6-t-butyl-3-methyl phenol) | (part) | — | — | — | — | — | — | 0.3 | — | — | — |
| N,N′-di-2-naphthyl p-phenylenediamine | (part) | 0.2 | — | — | — | — | — | — | — | — | — |
| N-phenyl-2-naphthyl amine | (part) | — | 0.2 | 0.3 | 0.1 | 4 | — | — | — | — | — |

Table 1-continued

| | | | | | | | | | | |
|---|---|---|---|---|---|---|---|---|---|---|
| Total dose (Mrad) | | 20 | 20 | 20 | 20 | 10 | 30 | 55 | 25 | 20 | 30 |
| Gel percent (%) | | 85 | 83 | 83 | 82 | 87 | 83 | 84 | 81 | 81 | 85 |
| *Foaming | | No | No | No | No | No | No | No | Yes | Yes | No |
| **Exothermic initiated temperature by DSC curve °C | before irradiation | 290 | 275 | 290 | 273 | 302 | 220 | 285 | 220 | 220 | 220 |
| | after irradiation | 290 | 265 | 285 | 263 | 299 | 220 | 250 | 220 | 220 | 220 |
| Lichtenberg figures | | No | No | No | No | No | Yes | Yes | Yes | Yes | No |

*Foamcells having size of 50μ was not detected (No).
*Foamcells having size of 50μ was detected (Yes).
**The exothermic initiated temperature is the temperature at the position in which sharp exothermic peak is produced in DSC curve. The data show that the higher the temperature, the better thermal aging resistance.

As shown in Table 1, in the samples prepared in the above Examples according to this invention, no foaming occurs, the Lichtenberg figures do not appear, and the thermal aging resistance of the sample is good. Whereas in the sample prepared from the resin not containing both the compound having acetylenic linkage and the aromatic secondary amino compound, either foaming of the sample occurs, or the Lichtenberg figure appear, and the thermal aging resistance of the sample is bad.

EXAMPLES 6–9 AND COMPARATIVE EXAMPLE 6–8

Each mixture of the components shown in the following Table 2 having the proportions shown in Table 2 was uniformly milled by heat roll. Sheets having a thickness of 3 mm were prepared from each of the uniform mixtures by press molding. Each sheet was intermittently irradiated with an electron beam (1 MeV, 1 × $10^5$ rad/sec) using an electron accelerator. The total dose of irradiation given to each sheet, gel percent of each sample, whether foaming of the sample was detected, dielectric breakdown voltage of each sample and whether appearance of the Lichtenberg figures was observed are shown in Table 2.

Table 2

| | | Example | | | | Comparative Example | | |
|---|---|---|---|---|---|---|---|---|
| | | 6 | 7 | 8 | 9 | 6 | 7 | 8 |
| polypropylene | (part) | 100 | — | — | — | 100 | — | — |
| polybutadiene | (part) | — | 100 | — | — | — | 100 | — |
| ethylene-vinyl acetate copolymer | (part) | — | — | 100 | 100 | — | — | 100 |
| tetramethylene dipropiolate | (part) | 5 | 10 | 10 | 40 | — | — | — |
| N,N'-di-2-naphthyl-p-phenylene-diamine | (part) | 0.2 | 0.2 | 0.2 | 0.5 | — | — | — |
| Total dose (Mrad) | | 20 | 20 | 20 | 20 | 30 | 30 | 30 |
| Gel percent (%) | | 80 | 88 | 89 | 95 | 10 | 80 | 83 |
| Dielectric breakdown voltage (Kv/mm) | | 80 | 55 | 45 | 45 | 30 | 15 | 15 |
| Foaming* | | No | No | No | No | No | No | No |
| Lichtenberg figures | | No | No | No | No | Yes | Yes | Yes |

*Foaming of each sample was observed in the same way as in previous Examples.

EXAMPLES 10–11 AND COMPARATIVE EXAMPLES 9–10

Each of the mixtures of components shown in the following Table 3 having the proportion shown in Table 3 was uniformly milled by heat roll to form samples; and each of the samples was formed into pellets. Each of the pellets was charged into an extruder having a cylinder 115 mm in diameter; and each of the samples was coated on leading wires to form a polyethylene insulated cable or ethylene-propylene copolymer insulated cable of 4 mm thickness from the extruder. The diameter of the resulting cables was 12 mm. Each cable was continuously irradiated with an electron beam (2 MeV, 3 mA, 1 × $10^6$ rad/sec). The total dose of irradiation given to each sheet, gel percent of each coated material, whether foaming of the coated was observed, distortion under heat of each cable, dielectric breakdown voltage of each sample and whether appearance of the Lichtenberg figures was observed are shown in Table 3.

Table 3

| | | Example | | Comparative Example | |
|---|---|---|---|---|---|
| | | 10 | 11 | 9 | 10 |
| polyethylene of low density | (part) | 100 | — | 100 | — |
| ethylene-propylene copolymer | (part) | — | 100 | — | 100 |
| calcium carbonate | (part) | — | 40 | — | 40 |
| dipropargyl sebacate | (part) | 2 | 10 | — | — |
| thio-bis(6-tert-butyl 3-methyl phenol) | (part) | — | — | 1.3 | 0.3 |
| N-phenylene-2-naphthylamine | | 0.2 | 0.2 | — | — |
| Total dose (Mrad) | | 20 | 20 | 40 | 40 |
| Gel percent (%) | | 86 | 83 | 80 | 79 |
| Foaming | | No | No | Yes | Yes |
| Rate of deformation by heat (%)* | | 15 | 25 | 30 | 40 |
| Dielectric breakdown voltage (Kv/mm) | | 85 | 45 | 10 | 10 |
| Lichtenberg figures | | No | No | Yes | Yes |

*The rate was determined at 120° C at weight of 5 Kg.

We claim:

1. A process for preventing Lichtenberg breakdown in the production of a molded product by irradiating a polyolefin resin with an electron beam comprising forming a blend consisting essentially of
   (1) a polyolefin-resin,
   (2) a compound represented by the formula X—Ym wherein X is a group not containing an acetylenic linkage, Y is a group containing an acetylenic linkage, and m is an integer of 1 or more, which is compatible with the resin at a room temperature or an elevated temperature, and (3) an aromatic secondary amino compound selected from the group consisting of (a) an aromatic secondary amino compound represented by the formula

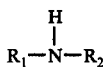

wherein each of $R_1$ and $R_2$ is independently aliphatic hydrocarbon, alicyclic hydrocarbon, or aromatic hydrocarbon provided that at least one of $R_1$ and $R_2$ is aromatic hydrocarbon, and each of the aliphatic hydrocarbon, the alicyclic hydrocarbon and the aromatic hydrocarbon may be substituted with hydroxy, methoxy, nitrile, chloro, bromo or fluoro; (b) an aromatic secondary amino compound represented by the formula

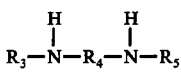

wherein each of $R_3$, $R_4$ and $R_5$ is independently aliphatic hydrocarbon, alicyclic hydrocarbon, or aromatic hydrocarbon, provided that at least one of $R_3$, $R_4$ and $R_5$ is aromatic hydrocarbon, and each of the aliphatic hydrocarbon, the alicyclic hydrocarbon and the aromatic hydrocarbon may be substituted with hydroxy, methoxy, nitrile, chloro, bromo or fluoro; and (c) a mixture thereof which is compatible with the resin at room temperature or at an elevated temperature the amount of the aromatic secondary amino compound being sufficient to prevent Lichtenberg breakdown of the resin; molding said blend or coating a substrate with said blend, and irradiating the resulting molded material or the resulting coated material with an electron beam.

2. The process defined in claim 1, wherein the compound represented by the formula I is selected from the group consisting of an ester of an acetylenic alcohol and a polybasic carboxylic acid and an ester of an acetylenic carboxylic acid and a polyhydric alcohol.

3. The process defined in claim 1 wherein the acetylenic compound is selected from the group consisting of dipropargyl maleate, dipropargyl fumarate, dipropargyl terephthalate, dipropargyl isophthalate, dipropargyl sebacate, tripropargyl trimesate, tetramethylene dipropiolate, hexamethylene dipropiolate, hydroquinone dipropiolate, catechol dipropionate or diethyleneglycol dipropiolate.

4. The process defined in claim 1 wherein the acetylenic is dipropargyl maleate.

5. The process defined in claim 1 wherein the resin is selected from the group consisting of polyethylene resin, polypropylene resin, polystyrene resin or ethylene-propylene copolymer resin.

6. The process defined in claim 1 wherein 0.1-5 parts by weight of the acetylenic compound and 0.05-5 parts by weight of the aromatic secondary amino compound are used per 100 parts by weight of polyethylene resin.

7. The process defined in claim 1 wherein 1-50 parts by weight of the acetylenic and 0.05-5 parts by weight of the aromatic secondary amino compound are used per 100 parts by weight of ethylene-propylene copolymer resin.

8. The process defined in claim 1 wherein the aromatic secondary amino compound is selected from the group consisting of N,N'-diphenyl-p-phenylenediamine, N-phenyl-2-naphthylamine, N,N-di-2-naphthyl-p-phenylenediamine, and a mixture thereof.

9. The process defined in claim 1 wherein the substrate is an electric cable.

10. The process defined in claim 1 wherein the molded product is an hollow tube or hollow pipe.

11. The process defined in claim 1 wherein the molded material or the coated material is irradiated with an electron beam at a dose rate of $10^2$-$10^7$ rad/sec.

12. The process defined in claim 1 wherein the molded material or the coated material is irradiated with an electron beam having accelerator energy of more than 1 MeV.

13. The process defined in claim 1 wherein the section size of the molded material or the thickness of the coated material is more than 0.5 mm.

* * * * *